United States Patent
Tsunetomo et al.

(10) Patent No.: US 7,329,372 B2
(45) Date of Patent: Feb. 12, 2008

(54) METHOD FOR PRODUCING ASPHERICAL STRUCTURE, AND ASPHERICAL LENS ARRAY MOLDING TOOL AND ASPHERICAL LENS ARRAY PRODUCED BY THE SAME METHOD

(75) Inventors: Keiji Tsunetomo, Osaka (JP); Takahiro Hashimoto, Osaka (JP); Hideshi Nagata, Osaka (JP); Shigeo Kittaka, Osaka (JP); Kenjiro Hamanaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 756 days.

(21) Appl. No.: 10/346,053

(22) Filed: Jan. 17, 2003

(65) Prior Publication Data

US 2003/0157211 A1    Aug. 21, 2003

(30) Foreign Application Priority Data

Jan. 18, 2002  (JP)  ............................ P2002-009395
Mar. 26, 2002  (JP)  ............................ P2002-087039

(51) Int. Cl.
*B29D 11/00* (2006.01)
(52) U.S. Cl. ..................... 264/2.5; 216/24; 425/808
(58) Field of Classification Search ................. 264/1.1, 264/2.5, 1.36, 219, 1.38; 216/24, 26; 425/808
See application file for complete search history.

(56) References Cited

U.S. PATENT DOCUMENTS 4,610,502 A * 9/1986 Nicia et al. ................. 385/131
5,549,212 A   8/1996 Kanoh et al.
2002/0084251 A1  7/2002 Ricks

FOREIGN PATENT DOCUMENTS

| EP | 0 146 160 A1 | 6/1985 |
| EP | 0 620 201 A2 | 10/1994 |
| EP | E9 0 911 144 A2 | 4/1999 |
| EP | 1 022 108 A1 | 7/2000 |
| EP | 1 069 082 A2 | 1/2001 |
| JP | 5-150103 * | 6/1993 |
| WO | WO 02/06560 A1 | 1/2002 |

OTHER PUBLICATIONS

Patent abstract of Japan vol. 1999, No. 4 Casio Comput co. LTD Jan. 29, 1999.
Patent abstract of Japan vol. 014, No. 008 Dannippon Printing Co LTD Oct. 16, 1989.
European Search Report dated Mar. 18, 2003.
Patent abstract of Japan,vol. 1995, No. 07 Asahi Glass Co LTD Apr. 21, 1995.
Derwent Publications Ltd. XP002234085 & JP 08 241891 dated Sep. 17, 1996.

* cited by examiner

*Primary Examiner*—Mathieu D. Vargot
(74) *Attorney, Agent, or Firm*—Whitham Curtis Christofferson & Cook, PC

(57) ABSTRACT

A method for producing an aspherical structure according to the invention includes the steps of: forming a layer on a surface of a substrate so that the layer exhibits an etching rate distribution in a direction perpendicular to the surface of the substrate; forming a mask having a predetermined opening shape on the surface of the layer; and etching the layer to thereby form at least one aspherical concave portion. When each concave portion is used as a molding tool so that a resin with which the concave portion is filled is solidified and removed from the concave portions an aspherical lens array can be formed accurately.

2 Claims, 10 Drawing Sheets

METHOD FOR PRODUCING ASPHERICAL STRUCTURE, AND ASPHERICAL LENS ARRAY MOLDING TOOL AND ASPHERICAL LENS ARRAY PRODUCED BY THE SAME METHOD

BACKGROUND OF THE INVENTION

The present invention relates to an aspherical structure, and particularly to a method for producing an aspherical lens in the optical field.

In the field of optical communication, improvement in speed and grade of optical signal processing has been demanded with the advance of increase in communication capacity. Optical elements need to be arrayed for parallel processing of optical signals so that optical coupling between the optical elements can be made with higher efficiency. A lens array is an optical element which fulfills an important role in such optical coupling.

For example, after divergent light rays emitted from a light sources an optical fiber end surface, or the like, are converted into parallel light rays and subjected to signal processing by an optically functional device, a pair of collimator lenses are used for converging and coupling the light rays to a photo detector, an optical fiber end surface, or the like. The distance between the collimator lenses maybe required to be increased in accordance with the optically functional device inserted in between the collimator lenses. In this case, it is necessary to enlarge the aperture of each lens. When each lens is a spherical lens made of a homogeneous material, it is however impossible to make the inter-lens distance larger than a certain value because aberration is inevitably produced with respect to light rays divergent from the optical axis.

An aspherical lens is used for solving this problem. When the surface shape of the lens is designed appropriately, aberration in the peripheral portion of the lens can be corrected. Such an aspherical lens is generally mass-produced by press molding using a molding tool formed by precision machining. Therefore, a molding tool producing technique is very important for production of the aspherical lens.

If a lens array molding tool is produced by machining, however, a cutter abrades. Hence, in the case of a lens array constituted by a large number of lens elements, there is a problem that the size of the molding tool varies in accordance with the respective lens elements. This problem can be solved when the molding tool is produced by etching. It is however difficult to form a molding tool for an aspherical structure because nothing but a spherical surface can be processed as long as the material of the molding tool is a homogeneous isotropic material.

The invention is developed to solve the problem and an object of the invention is to provide a method for producing an aspherical structure such as an aspherical lens array in which uniform lens elements can be formed.

SUMMARY OF THE INVENTION

The method of producing an aspherical structure according to the invention includes:

the step (1) of forming a layer on a surface of a planar substrate so that the layer exhibits an etching rate distribution in a direction perpendicular to the surface of the planar substrate with respect to predetermined etching means;

the step (2) of forming a mask having a predetermined opening shape on a surface of the layer formed by the step (1) and exhibiting an etching rate distribution;

the step (3) of etching the layer exhibits an etching rate distribution through the mask formed by the step (2) for a predetermined time by the predetermined etching means to thereby form at least one concave portion;

the step (4) of filling the concave portion with a fluid substance and solidifying the fluid substance; and the step (5) of removing the solidified substance from the concave portion.

In the producing method, the etching rate distribution is preferably a continuous distribution but may be a stepped distribution.

Incidentally, the method may be terminated at the step (3) or (4) in accordance with the purpose.

When the method is terminated at the step (3) in the condition that the mask has a plurality of circular openings as the opening shape, an aspherical lens array molding tool can be formed.

When the aspherical structure produced by use of a transparent layer exhibiting an etching rate distribution is filled with a transparent fluid substance, that is, when the method is terminated at the step (4), an aspherical lens array can be formed.

When the aspherical lens array molding tool is filled with a transparent fluid substance and then the fluid substance is solidified and removed from the molding tool, that is, when the method is terminated at the final step (5), an aspherical lens array can be also formed.

The invention further provides the following: An aspherical lens molding tool is produced by forming a homogeneous layer on a surface of a substrate, the layer being different in etching rate from the substrate; forming a mask on the layer, the mask having an opening shape; etching the layer and the substrate through the mask for a predetermined time; removing the mask; and etching the layer and the substrate again to remove at least the layer and form a concave portion.

In addition, since etching is carried out again to remove the layer as described above, the obtained aspherical lens molding tool is made from the material of the substrate. It is therefore unnecessary to take into consideration the chemical reaction or the wettability between the material of the layer and a material to be filled with at the time of molding. Further, it is also unnecessary to take into consideration the difference in adsorption between the substrate and the layer at the time of molding an aspherical lens.

A material higher in etching rate than the substrate is selected as the material for forming the layer.

The upper limit of the range that the thickness of the layer can take is 1,000 µm, and the lower limit thereof is 1 µm. Preferably, the upper limit of the range is 500 µm, and the lower limit thereof is 10 µm. More preferably, the upper limit of the range is 300 µm, and the lower limit thereof is 20 µm.

The concave portion of the aspherical lens molding tool is set to have a shape in which the depth of the deepest portion of the concave portion is smaller than ½ of the width of the concave portion. In addition, the concave portion is set to have a curvature radius larger in a portion closer to an end portion of the concave portion.

With such a configuration, in a lens obtained by the lens molding tool, the lens thickness is smaller than the lens radius, and the curvature radius in the peripheral portion of the lens is larger than that in the vertex portion of the lens. That is, it is possible to produce a lens having a small spherical aberration.

After the concave portion is formed, a fluid substance with which the concave portion is filled is solidified to form an aspherical lens.

Alternatively, after the concave portion is formed, a fluid substance with which the concave portion is filled is solidified, and the solidified substance is removed from the concave portion so as to form an aspherical lens.

An aspherical lens array may be obtained when an aspherical lens array molding tool provided with a plurality of concave portions is filled with a transparent resin higher in refractive index than the molding tool, and the filled resin is solidified.

An aspherical lens array may be obtained when an aspherical lens array molding tool provided with a plurality of concave portions is filled with a transparent resin higher in refractive index than the air, and the filled resin is solidified and then removed from the molding tool.

The present disclosure relates to the subject matter contained in Japanese patent application Nos. 2002-009395 (filed on Jan. 18, 2002) and 2002-87039 (filed on Mar. 26, 2002), which are expressly incorporated herein by reference in their entireties.

DESCRIPTION OF THE PREFERRED EMBODIMENT

A method for producing an optical communication collimator array using an aspherical lens array will be described below as an embodiment of the invention.

Although a molding tool of a resin is generally produced by precision machining, processing by chemical or physical etching is conceivable as another method for producing a molding tool. In practice, a glass molding tool for a resin lens is produced by etching.

When, for example, silica glass is etched with a hydrofluoric acid-based etching solution in the condition that a mask having a circular opening is formed on a surface of the silica glass, a hemispherical concave portion can be formed in the surface of the silica glass. Because the opening portion of the mask can be produced accurately by a photolithography technique, the problem of variation in dimension due to machining can be solved.

The surface obtained by the etching, however, comes close to a spherical surface because the silica glass is etched isotropically. Hence, it is impossible to obtain an aspherical surface adapted to correction of aberration. An important point of the invention is that a substance exhibiting an etching rate distribution in a direction of the depth of the substrate is used as a substance to be etched because the aspherical surface can be formed by etching.

An example of the method for forming a substance exhibiting an etching rate distribution will be described. An $SiO_2$ thin film can be formed by a chemical vapor deposition (CVD) method. It is known that the etching rate of the film with a hydrofluoric acid-based etching solution changes when fluorine (F) is added into the film (see WO02/06560A1). Fluorine (F) can be added into the $SiO_2$ film when $CF_4$ gas is mixed during the formation of the $SiO_2$ film. The amount of fluorine (F) added into the $SiO_2$ film can be changed when the flow rate of the $CF_4$ gas is changed.

Figure 1:
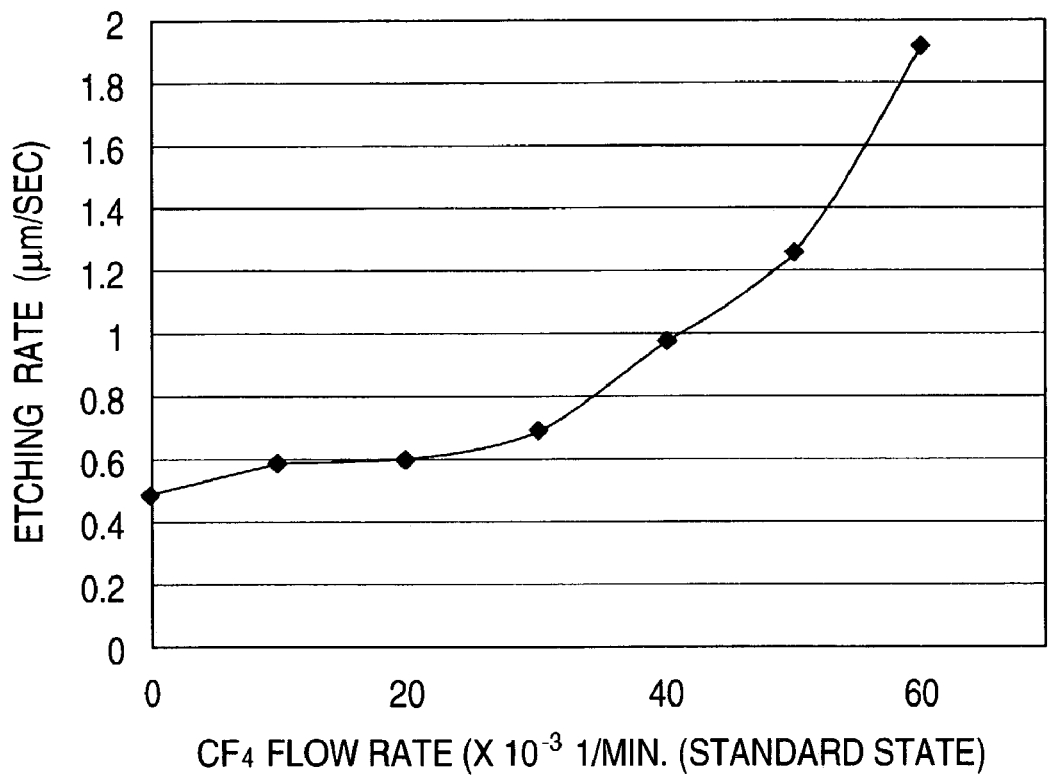
FIG. 1 is a graph showing etching characteristic of a fluoridated $SiO_2$ film with an aqueous solution of hydrofluoric acid.

FIG. 1 shows the relation between the flow rate of $CF_4$ and the etching rate of the $SiO_2$ film with an aqueous solution of 5% hydrofluoric acid. It is found that the etching rate changes by about three times when the flow rate of $CF_4$ is changed in a range of from 0 to $60 \times 10^{-3}$ l/min.

When the flow rate of $CF_4$ is controlled to be changed on the basis of this result while the $SiO_2$ film is grown by the CVD method, a fluoridated (F-added) $SiO_2$ layer in which the etching rate with hydrofluoric acid changes continuously can be formed. It is a matter of course that if a plurality of films different in the amount of F added are laminated in the condition that each film is formed at a constant flow rate of $CF_4$ so that a constant amount of F is added into the film, an $SiO_2$ film in which the etching rate changes stepwise can be formed.

Next, production of an aspherical lens array used as a collimator lens array will be described.

Example of Lens Design

Figure 2:
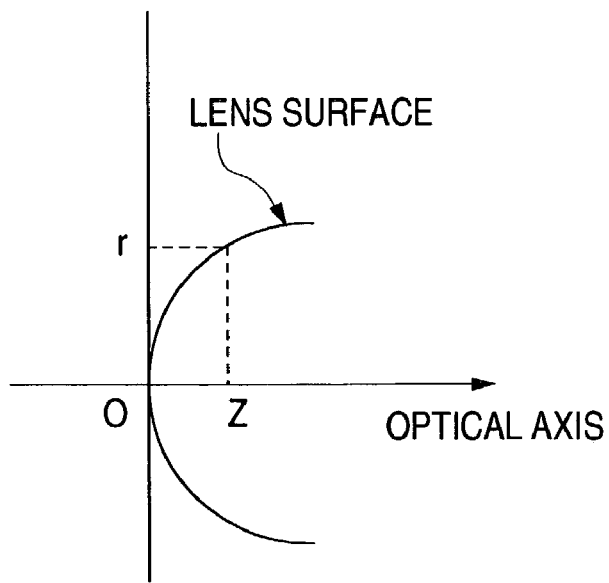
FIG. 2 is a graph for explaining the definition of the surface shape of a lens.

The aspherical shape of an aspherical lens is generally given by the following expression:

$$Z = Cr^1/\{1 + (l - C^1 r^1)^{1/2}\} + AD \cdot r^4 + AE \cdot r^6 + \ldots$$

in which r is the radial distance from the center of the lens, and Z is the Sagitta (sagittal distance), that is, the distance taken in the direction or the optical axis from the apex of the lens to the position r of the lens surface as shown in FIG. 2. Assuming that $R_D$ is the curvature radius of the lens on the optical axis, then the relation $C=1/R_D$ is obtained and AD, AE, . . . are high-order coefficients. When all the high-order coefficients AD, AE, . . . are zero, Z given by only the first term of the right side in the aforementioned expression shows a spherical surface.

Figure 3:
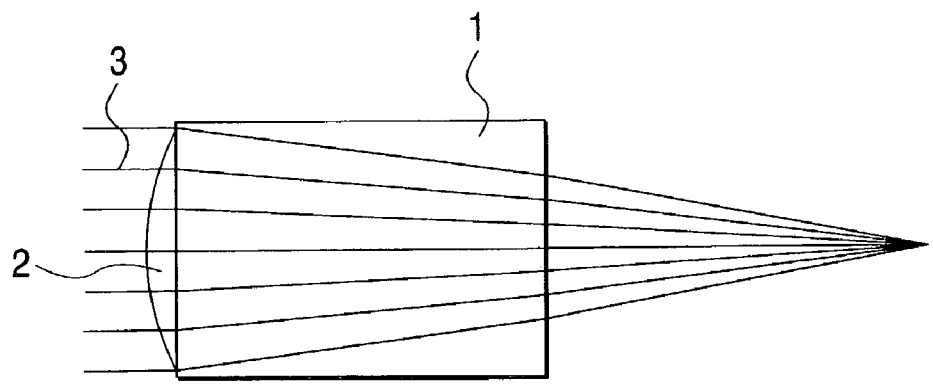
FIG. 3 is a schematic view showing an optical system of a collimator according to an embodiment of the invention.

This design example is provided on the assumption that a lens 2 of a resin having a refractive index of 1.41 is formed on a 1.0 mm-thick silica glass substrate 1 (having a refractive index of 1.457) as shown in FIG. 3. Assuming that the diameter of incident light flux 3 is 0.99 mm and that high-order terms up to the sixth-order term are considered, then it is reasonable that the following equations are satisfied in order to obtain the highest coupling efficiency as a collimator.

$R_D$=1.0619 mm

AD=−0.05665 mm$^{-3}$

AE=−0.0526 mm$^{-5}$

Figure 4:
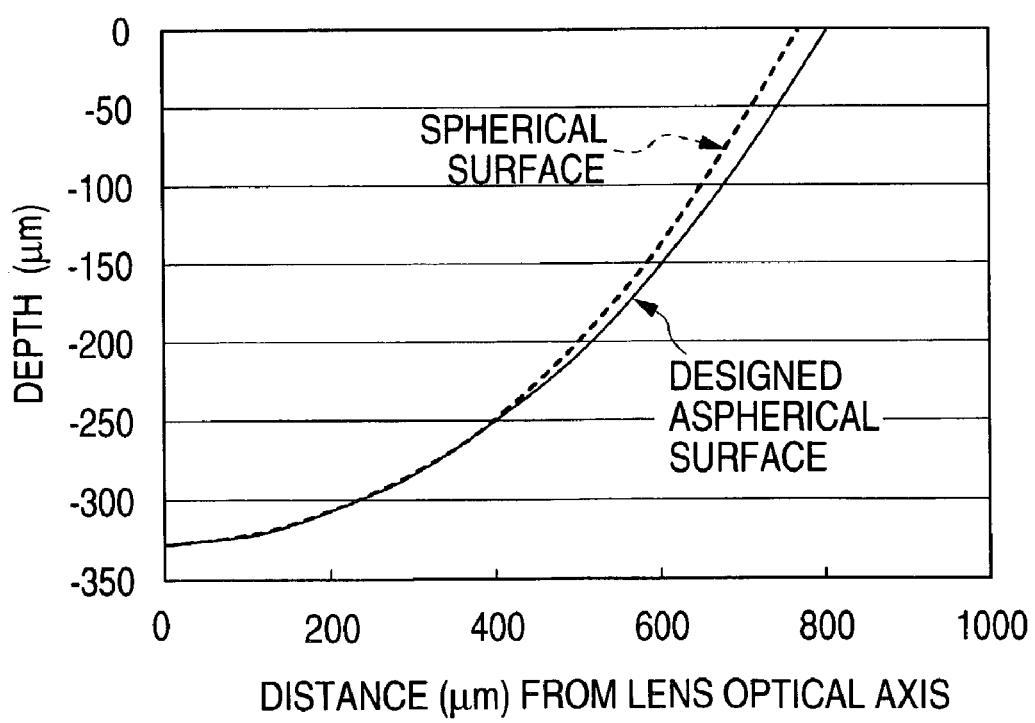
FIG. 4 is a graph showing an aspherical shape based on a design example of the invention.

This aspherical shape is shown in FIG. 4 in comparison with the case for the spherical shape (AD=AE=0). Incidentally, in this design example, the lens thickness is 0.122 mm.

First Embodiment

FIGS. 5A to 5H show a process for producing a lens array.

Figure 5A:
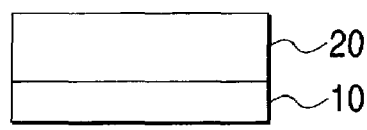
FIGS. 5A to 5H are views showing an example of the process for producing a lens array according to the invention.
Figure 6:
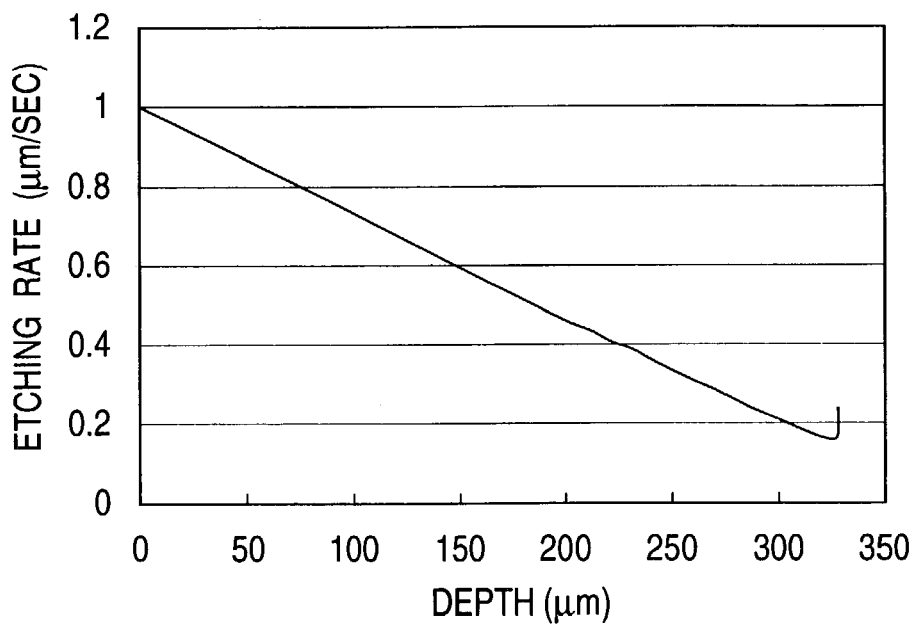
FIG. 6 is a graph showing the etching rate distribution of the fluoridated $SiO_2$ film in the embodiment of the invention.
Figure 7:
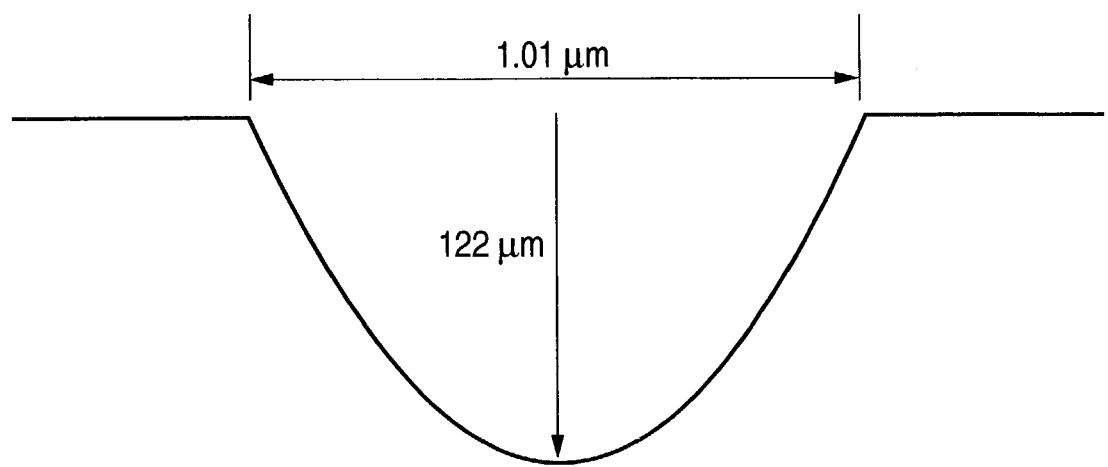
FIG. 7 is a typical view showing a concave shape formed in the embodiment of the invention.

While the amount of F added is controlled, an SiO$_2$ layer 20 is formed on a silica glass substrate 10 so that the total thickness of the SiO$_2$ layer 20 is 200 μm (FIG. 5A). FIG. 6 shows the etching rate distribution due to etching with an aqueous solution of 5% hydrofluoric acid in a direction of the depth of the layer.

Figure 5B:
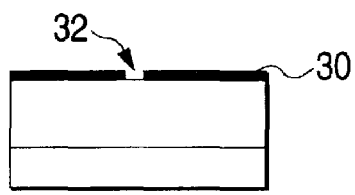
Figure 5C:
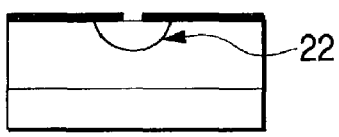
Figure 5D:
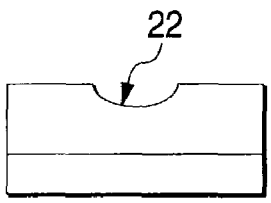
Figure 5E:
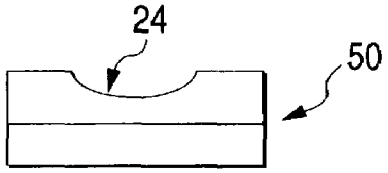

A Cr film 30 is formed on a surface of the SiO$_2$ layer and a plurality of circular openings 32 each with an opening diameter of 5 μm are formed like intersections of a grid by photolithography (FIG. 5B). Incidentally, FIG. 52 shows only one opening for the sake of simplification. While the Cr layer is used as a mask, the SiO$_2$ layer is etched with an aqueous solution of hydrofluoric acid (FIG. 5C). As a result, concave portions 22 each having a sectional shape as shown in FIG. 5D are formed. Because the lens thickness is defined by the aforementioned lens design, the whole of the SiO$_2$ layer may be etched again after the removal of the Cr layer (FIG. 5D) as occasion demands. The depth of each concave portion is therefore adjusted so that the lens thickness becomes a defined value (FIG. 5E). If it is unnecessary to adjust the lens thickness, this step may be omitted.

Then, the concave portions 24 formed thus are used as a lens molding tool 50 for producing an aspherical lens array by molding.

Figure 5F:
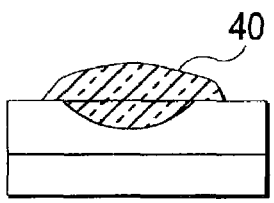
Figure 5G:
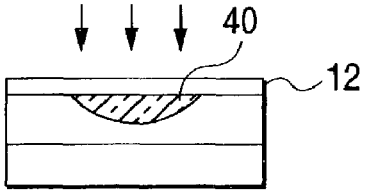
Figure 5H:
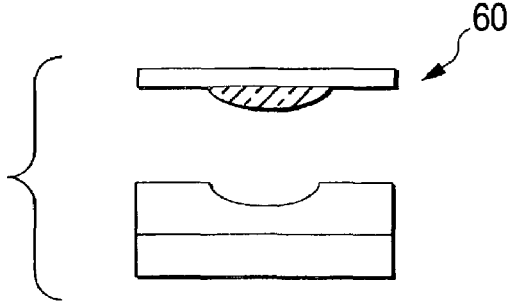

After a releasant is applied to the concave portions 24 of the molding tool 50 produced thus, the concave portions 24 are filled with an ultraviolet-curable resin 40 which will exhibit a refractive index of 1.41 after curing (FIG. 5F). Then, a 1.0 mm-thick silica glass substrate 12 is pressed against the molding tool 50 from above (FIG. 5G). In this condition, the resin 40 is irradiated with ultraviolet rays. After the resin 40 is cured, the resin 40 is released from the molding tool 50 (FIG. 5H). By the aforementioned steps, a lens array 60 constituted by lenses each substantially having an aspherical shape can be formed.

The aspherical lenses obtained thus are used for forming collimators in order to evaluate the characteristic thereof as follows. A pair of collimators each constituted by a single mode optical fiber and the produced aspherical lens are disposed so that the optical axes of the optical fibers coincide with each other. The pair of collimators are adjusted so that collimated light rays propagate between the two aspherical lenses. When insertion loss between the optical fibers is evaluated in this condition, a sufficiently small value of about 0.2 dB is obtained.

Second Embodiment

Although the first embodiment has been described on the case where the amount of F added is controlled continuously, the amount of F added may be controlled stepwise. Twenty points are taken at regular intervals in the thicknesswise direction on the distribution curve in FIG. 6. An amount of F corresponding to each of the points is added to an SiO$_2$ layer. Twenty fluoridated SiO$_2$ layers formed in this manner and each having a thickness of 10 μm are laminated.

When the laminated layer is etched in the same manner as in the first embodiment, an aspherical lens array can be also formed. The number of layers to be laminated is not limited to the aforementioned number.

Third Embodiment

The film-forming method according to the second embodiment in which the amount of F added is controlled delicately and stepwise is slightly complex because a precision flow rate controller is required. A method simplified so that the number of layers to be laminated is reduced will be described.

Figure 8A:
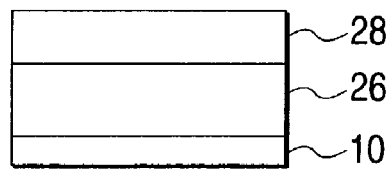
FIGS. 8A to 8F are views showing another example of the process for producing a lens array according to the invention.

FIGS. 8A to 8F show a method for forming one or two homogeneous layers. After an additive-free SiO$_2$ layer 26 is formed on a silica glass substrate 10, a predetermined amount of F is added into an SiO$_2$ layer to form a fluoridated SiO$_2$ layer 28 (FIG. 8A). Alternatively, the additive-free SiO$_2$ layer 26 may be omitted so that only one fluoridated SiO$_2$ layer 28 is formed directly on the silica glass substrate 10. Generally, because an SiO$_2$ layer formed by the CVD method is higher in etching rate with hydrofluoric acid than a silica glass substrate, an appropriate etching rate may be sometimes obtained in the case where an additive-free SiO$_2$ layer is formed on a silica glass substrate by the CVD method.

Figure 8B:
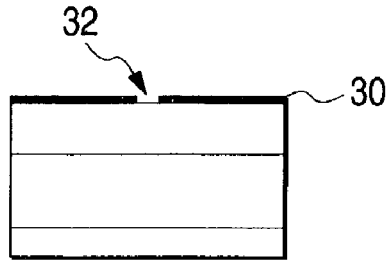
Figure 8C:
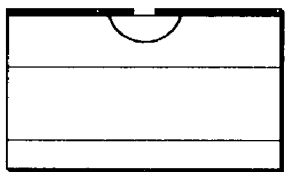
Figure 8D:
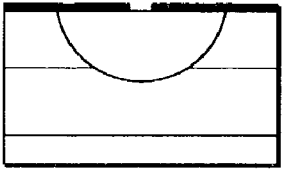
Figure 8E:
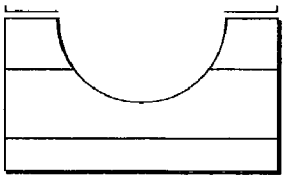
Figure 8F:
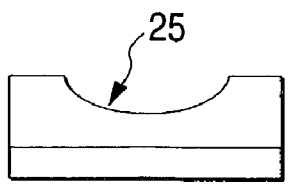

A Cr layer 30 is formed on a surface of the fluoridated SiO$_2$ layer 28 and a plurality of circular openings 32 each having an opening diameter of 5 μm are formed like intersections of a grid by photolithography (FIG. 8B). While the Cr layer is used as a mask, the fluoridated SiO$_2$ layer 28 is etched with an aqueous solution of hydrofluoric acid (FIG. 5C). Etching is performed so that the resulting hole pierces the fluoridated SiO$_2$ layer 28 and reaches the additive-free SiO$_2$ layer 26 located under the fluoridated SiO$_2$ layer 28 (FIG. 8D). Then, after the Cr mask is removed, the whole of the surface is etched again so that the whole of the fluoridated SiO$_2$ layer 28 formed by the CVD method is removed (FIG. 8E). On this occasion, the depth of each concave portion 25 is adjusted so that the lens thickness becomes a defined value.

Though not shown, a lens array is molded in the same manner as in the first or second embodiment.

When the thickness of the fluoridated SiO$_2$ layer is set at 200 μm and the etching rate of the fluoridated SiO$_2$ layer is set at 1.7 times as high as that of the additive-free SiO$_2$ layer, concave portions each having a shape approximately close to the design value are obtained. Also in the case where the thickness of the fluoridated SiO$_2$ layer is set at 100 μm and the etching rate of the fluoridated SiO$_2$ layer is set at 2 times as high as that of the additive-free SiO$_2$ layer or in the case where the thickness of the fluoridated $SiO_2$ layer is set at 30 μm and the etching rate of the fluoridated $SiO_2$ layer is set at 2.5 times as high as that of the additive-free $SiO_2$ layer, concave portions each having a shape similar to the aforementioned shape are obtained.

Aspherical lenses obtained by using the concave portions as a molding tool are used for forming a collimator optical system in the same manner as in the first embodiment. When insertion loss of the collimator optical system is evaluated, a value of about 0.3 dB which can stand comparison with the value obtained in the first embodiment is obtained.

Although the embodiments have been described on the case where an $SiO_2$ layer exhibiting an etching rate distribution is formed by a CVD method, the film-forming method is not limited thereto. For example, a vacuum vapor deposition method, or a high-density plasma assist vapor deposition method may be used.

Although the embodiments have been described on the case where the change of the etching rate of a fluoridated $SiO_2$ film due to etching with an aqueous solution of hydrofluoric acid is utilized, the producing method according to the invention is not limited thereto. Various etching means are provided in accordance with materials to be etched. Besides the liquid-phase etching means, reactive ion etching means or chemical or physical etching means such as laser ablation performed in gas phase may be used. If materials different in etching rate with respect to these etching means are used, the same processing as described above can be made.

Although the embodiments have been described on the case where concave portions formed by etching are used as a molding tool for forming resin convex lenses on a substrate, the form of each lens is not limited thereto. Because all the processed $SiO_2$ materials are transparent, the concave portions filled with a high-refractive-index resin may be used directly so as to function as a convex lens array. Alternatively, each of the processed concave portions may be used directly as an aspherical concave lens.

The aspherical structure which can be molded is not limited to a lens array but may be a single lens. The invention is, however, remarkably effective in simultaneously producing a plurality of identical shapes compared with the related art. This is because variation in dimension in a large number of elements is caused by abrasion of a cutter if a molding tool constituted by the large number of elements is produced by related-art machining but processing can be however carried out with considerable accuracy if a molding tool constituted by a single element is produced by related-art machining.

If a reflecting film of a metal or the like is formed on each of the formed concave portions, an aspherical concave mirror can be formed as another product than the lens. Further, if the opening shape of the mask is not circular but stripe-like, groove-like concave portions can be formed. If the etching rate distribution is adjusted, the groove-like concave portions can be used as groove members each having a desired sectional shape. The groove members can be used for holding cylindrical optical components such as optical fibers. Further, concave portions each having a nearly elliptic sectional shape with a depth larger than a width, which were particularly hard to produce in the related art, can be formed so that the surface shape of each concave portion becomes any shape such as a circular shape, or a groove shape. Such an aspherical structure is used effectively for micro optical components, micro fluid applied components, etc. Further, the groove-like concave portions may be used as a molding tool for forming lenticular lenses each having a modified circular shape in section.

When a layer exhibiting an etching rate distribution is etched through a mask, a molding tool for molding an aspherical structure accurately or an aspherical structure itself can be formed. The invention is particularly effectively applied to molding of an aspherical lens array.

In addition, although the layer exhibiting the etching rate distribution is formed on a substrate, and that layer is etched, the present invention should not be restricted thereto or thereby. For example, a layer having an etching rate different from an etching rate of a substrate may be formed on the substrate, and not only that layer but also the substrate may be etched. In this case, that layer and the substrate combined together form a layer exhibiting an etching rate distribution.

Fourth Embodiment

Figure 9A:
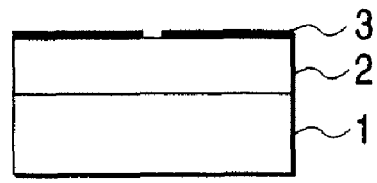
FIGS. 9A to 9E are sectional views for explaining a method of producing an aspherical lens molding tool according to a fourth embodiment of the invention.

FIGS. 9A to 9E are views for explaining a method of producing an aspherical lens molding tool according to the invention in processing sequence. First, as shown in FIG. 9A, a homogenous layer 2 different in etching rate from a silica glass substrate 1 is formed on the surface of the silica glass substrate 1.

Figure 11:
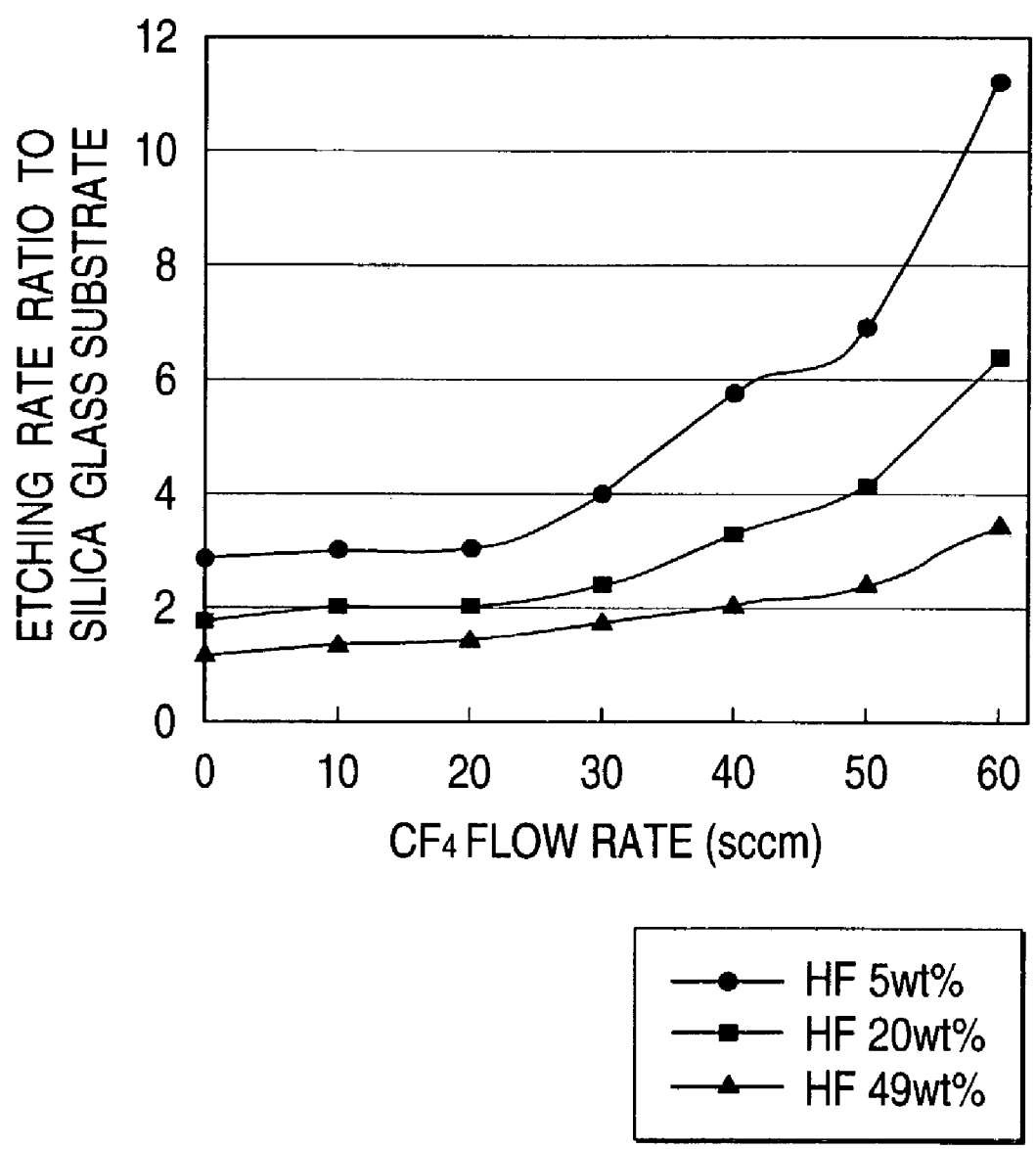
FIG. 11 is a graph showing the etching rate ratio of the fluoridated $SiO_2$ film to a silica glass substrate for each concentration of the aqueous solution of hydrofluoric acid.

FIG. 11 shows the variation of the etching rate ratio of the CVD film to the silica glass substrate in accordance with the $CF_4$ flow rate for each concentration of the aqueous solution of hydrofluoric acid. It is understood that the etching rate ratio of the CVD film to the silica glass substrate can be varied also by changing the concentration of the aqueous solution of hydrofluoric acid (HF) for use in etching.

On the basis of this result, an $SiO_2$ film is formed in the CVD method with the $CF_4$ flow rate being constant and hence with the amount of F added being constant, while the concentration of the aqueous solution of hydrofluoric acid is selected. Hence, an $SiO_2$ layer having a selected etching rate ratio to the substrate can be formed.

For example, the layer 2 is formed in the CVD method so as to satisfy the following relationship. That is, the etching rate ratio of the layer 2 to the silica glass substrate 1 is 2.5 when the layer 2 having a thickness of 30 μm is etched with an aqueous solution of 5 wt % hydrofluoric acid. The etching rate ratio of the layer 2 to the silica glass substrate 1 is 2.0 when the layer 2 having a thickness of 100 μm is etched with an aqueous solution of 20 wt % hydrofluoric acid. The etching rate ratio of the layer 2 to the silica glass substrate 1 is 1.7 when the layer 2 having a thickness of 200 μm is etched with an aqueous solution of 49 wt % hydrofluoric acid.

As shown in FIG. 11, the etching rate ratio is not limited to that in this embodiment. The etching rate ratio is variable in a range of 1.1-11.0, and the film thickness can be set in a range of 1-1,000 μm.

Incidentally, although the layer 2 is formed in the CVD method in this embodiment, an ion plating method or a vacuum deposition method may be used.

Next, as shown in FIG. 9A, a Cr film is deposited, and a mask 3 made of Cr and having a circular opening with a diameter of 5 μm is then formed in a photolithography method. Although Cr is used as the material of the mask in this embodiment, a material using Ti, ITO or Al as its base may be used.

Figure 9B:
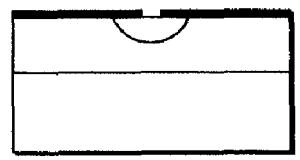
Figure 9C:
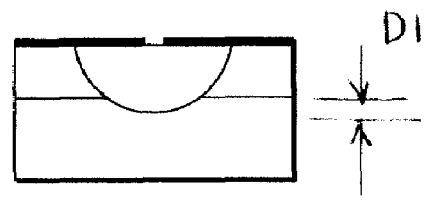
Figure 9D:

Next, wet etching is performed using an aqueous solution of hydrofluoric acid. As shown in FIG. 9B, etching proceeds isotropically up to the interface between the layer 2 and the silica glass substrate 1. After the etching has proceeded to reach the interface between the layer 2 and the silica glass substrate 1, continuously anisotropic etching proceeds as shown in FIG. 9C because the etching rate in the silica glass substrate 1 is slower than that in the layer 2. After the wet etching has formed a groove or pit in the substrate 1 having a depth D1. shown in FIG. 9C, which is less than the final depth D2 shown in FIG. 9E and described below, the mask is removed and a groove having an aspherical portion is obtained as shown in FIG. 9D.

Figure 9E:
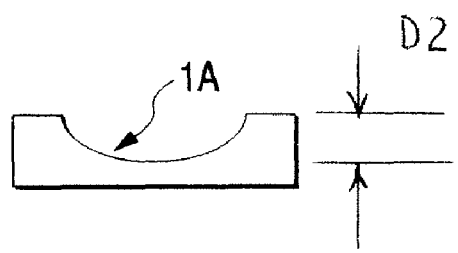
Figure 10:
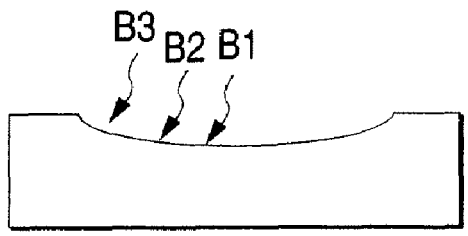
FIG. 10 is a sectional view of the aspherical lens molding tool according to the fourth embodiment.

Next, wet etching with the aqueous solution of hydrofluoric acid is performed on the laminate of the silica glass substrate 1 and the layer 2 again without forming any mask on the surface of the silica glass substrate in which the groove having an aspherical portion has been formed. This wet etching is continued till at least the layer 2 is removed completely, whereupon a concave portion 1A is formed as shown in FIG. 9E. having a depth D2, greater than the wet etched depth D1. By performing etching in two stages as described above, the concave portion 1A has a larger curvature radius than that when the first stage of etching has been finished. The concave portion 1A has a shape that the depth D2 of the deepest portion of the concave portion 1A is smaller than ½ of the width of the concave portion 1A. In addition, since the layer 2 having a constant curvature is removed, the formed concave portion has an aspherical shape in which the curvature increases continuously as the location goes farther toward an end portion of the concave portion, that is, the curvature becomes larger at the point B1 or B2 that at the point B2 or B3, as shown in FIG. 10.

Figure 12A:
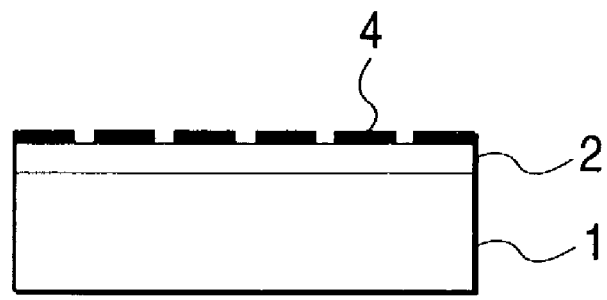
FIGS. 12A and 12B are sectional views for explaining a method of producing an aspherical lens array molding tool according to the fourth embodiment.
Figure 12B:
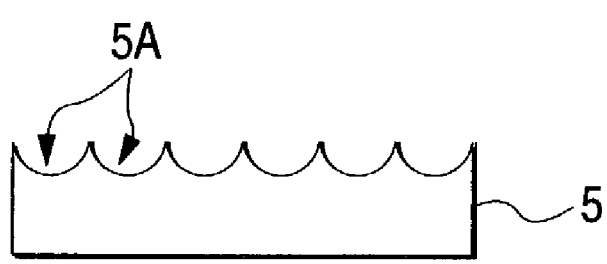

In addition, as shown in FIG. 12A, a mask 4 (made of Cr) having a plurality of circular openings is formed, and two stages of etching are carried out in the aforementioned manner. Thus, an aspherical lens array molding tool 5 having a plurality of concave portions 5A is obtained as shown in FIG. 12B.

Figure 13A:
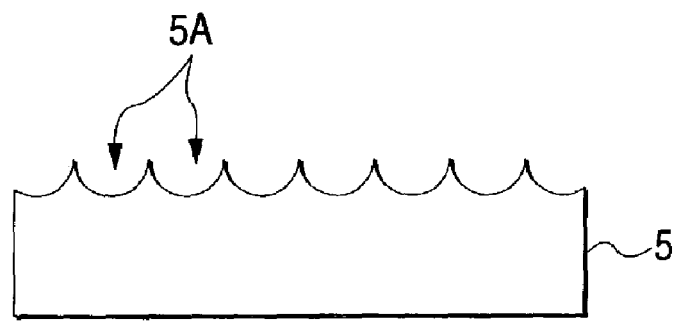
FIGS. 13A to 13C are sectional views for explaining a method of producing an aspherical lens array according to the fourth embodiment.
Figure 13B:
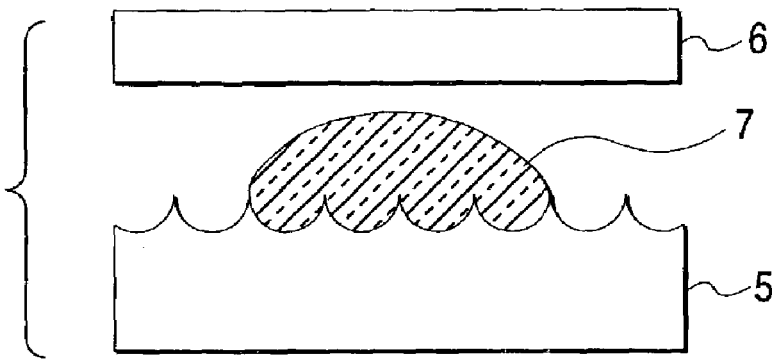
Figure 13C:
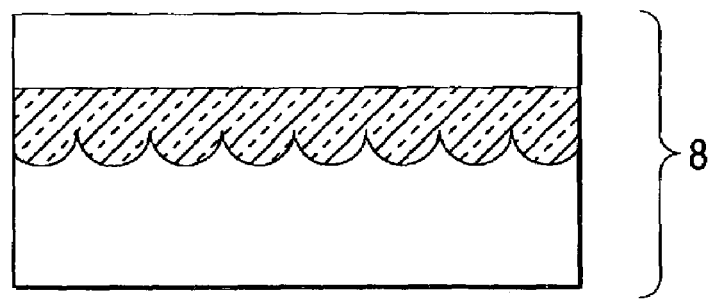

An aspherical lens array molding tool 5 having a plurality of concave portions 5A is obtained thus as shown in FIG. 13A. Ultraviolet-curing type transparent epoxy-based resin 7 is dripped onto the aspherical lens array molding tool 5 as shown in FIG. 13B. Then, the aspherical lens array molding tool 5 is covered with a lens substrate 6 so as to be filled with the epoxy-based resin 7. The epoxy-based resin 7 is irradiated with ultraviolet rays so as to be cured. Thus, an aspherical lens array 8 like a flat plate can be formed as shown in FIG. 13C. When epoxy-based resin having a higher refractive index than that of the aspheric lens array molding tool 5 and that of the lens substrate 6 is selected as the epoxy-based resin 7, a lens effect can be obtained between the epoxy-based resin 7 and the aspherical lens array molding tool 5. It is desired that epoxy-based resin whose refractive index is not lower than 1.65 is used as the epoxy-based resin 1.

Figure 14A:
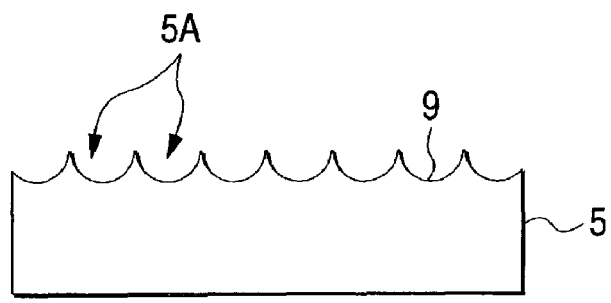
FIGS. 14A to 14D are sectional views for explaining a method of producing an aspherical lens array according to the fourth embodiment.
Figure 14B:
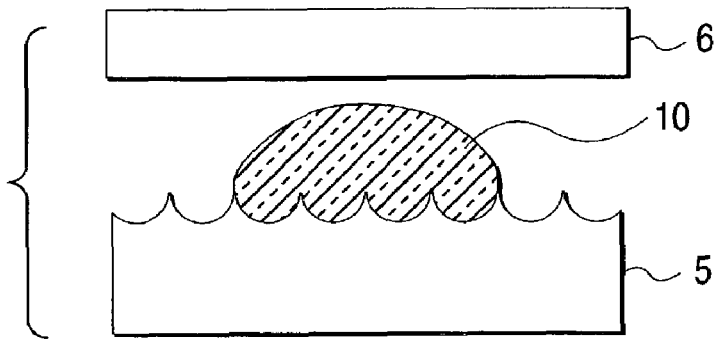
Figure 14C:
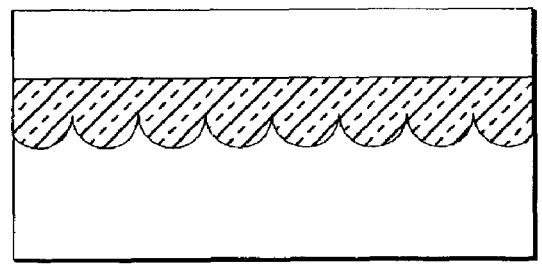
Figure 14D:
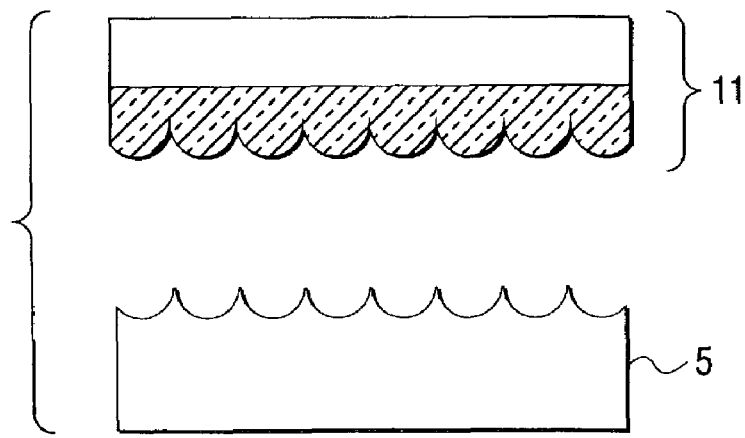

A releasant 9 is applied to an aspherical lens array molding tool 5 obtained in the same manner and having a plurality of concave portions 5A as shown in FIG. 14A. Ultraviolet-curing type transparent epoxy-based resin 10 is dripped onto the aspherical lens array molding tool 5 as shown in FIG. 14B. Then, the aspherical lens array molding tool 5 is covered with a lens substrate 6 so as to be filled with the epoxy-based resin 10 as shown in FIG. 14C. The epoxy-based resin 10 is irradiated with ultraviolet rays so as to be cured. The plurality or concave portions 5A of the aspherical lens array molding tool 5 have been transferred to the epoxy-based resin 10. Thus, when the epoxy-based resin 10 is released from the aspherical lens array molding tool 5, an aspherical lens array 11 constituted by the epoxy-based resin 10 and the lens substrate 6 can be formed as shown in FIG. 14D.

It is desired that epoxy-based resin whose refractive index is higher than that of the air and equal to that of the lens substrate 6 is used as the epoxy-based resin 10.

Although epoxy-based resin is used in this embodiment, acrylic-based resin may be used. In addition, the ultraviolet-curing type resin may be replaced by a thermosetting type or photo-curing type transparent material.

In addition, although a mask having a circular opening is used in this embodiment, a mask having a rectangular opening in place of the circular opening may be used to form a concave portion which is aspheric in section.

As described above, according to the invention, a homogenous layer different in etching rate from a substrate is formed on the surface of the substrate, and wet etching is carried out on the laminate of the substrate and the layer by use of a mask. Thus, it is possible to form a molding tool having an aspherical concave portion and an aspherical lens array.

What is claimed is:

1. A method of producing an aspherical lens molding tool by forming a concave aspherical recess of a given depth in a substrate, comprising the steps of:
    forming a homogeneous layer on a surface of the substrate, said homogeneous layer being higher in etching rate than said substrate;
    forming a mask on said homogeneous layer, said mask having an opening of a shape;
    etching through said homogeneous layer to form a pit in said substrate, through said opening of said mask, said pit depth being less than said given depth;
    removing said mask; and
    etching said homogeneous layer and said pit in said substrate, said etching performed until said pit is further etched to said given depth to form said concave aspherical recess in said substrate layer, and said homogenous layer is removed from an area of said substrate surrounding said concave aspherical recess.

2. A method of producing an aspherical lens molding tool according to claim 1, wherein a ratio of etching rate of said layer to etching rate of said substrate is 1.1-11.0.

* * * * *